United States Patent

Borum

[11] 4,111,121
[45] Sep. 5, 1978

[54] MULTI-IMPRESSION PRINTER FOR PRESSURE SENSITIVE LABELS

[75] Inventor: Charles Jerry Borum, Troy, Ohio

[73] Assignee: Hobart Corporation, Troy, Ohio

[21] Appl. No.: 693,789

[22] Filed: Jun. 7, 1976

[51] Int. Cl.² .......................................... B41F 13/56
[52] U.S. Cl. ................................... 101/227; 101/228; 156/152; 156/247; 221/73; 101/288
[58] Field of Search ........................... 156/384–388, 156/152, 247, 519, 584; 101/224, 288, 227–228; 221/72–74; 177/2–8; 235/58 P

[56] References Cited

U.S. PATENT DOCUMENTS

| | | | |
|---|---|---|---|
| 3,220,909 | 11/1965 | Kaplan | 156/386 |
| 3,425,346 | 2/1969 | Voigt | 101/292 |
| 3,574,026 | 4/1971 | Kucheck | 156/247 |
| 3,938,698 | 2/1976 | McDavid | 221/73 |
| 3,951,061 | 4/1976 | Bremmer | 101/227 |

Primary Examiner—Edgar S. Burr
Assistant Examiner—A. Heinz

[57] ABSTRACT

Plural printing stations are located wherever convenient within a printing machine for pressure sensitive labels. Each label is individually printed at each station by detaching the label from its release web after each printing operation, advancing the label, and reattaching the label to a different portion of the web prior to the next printing operation.

27 Claims, 8 Drawing Figures

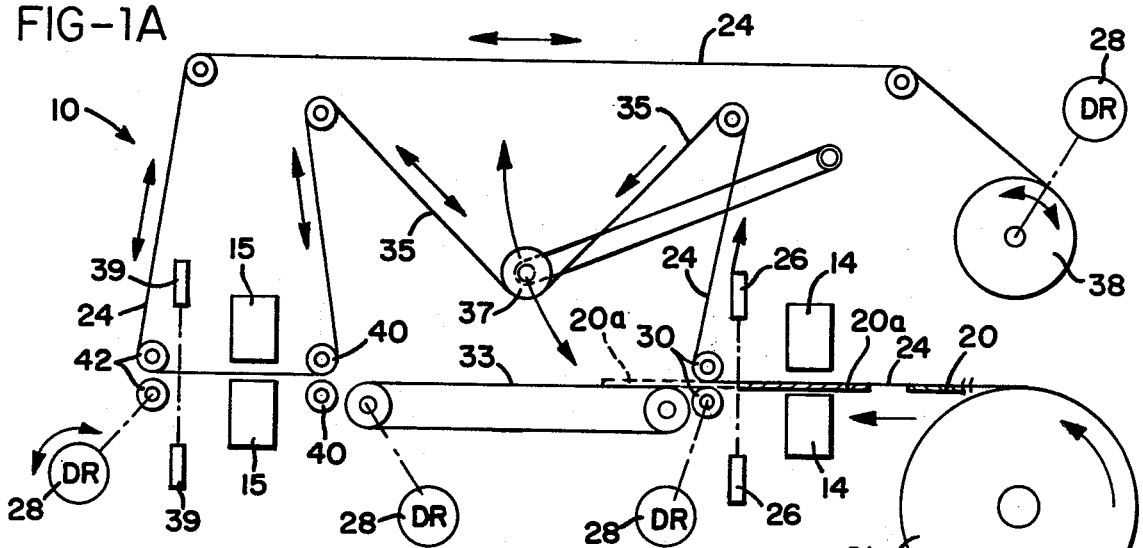
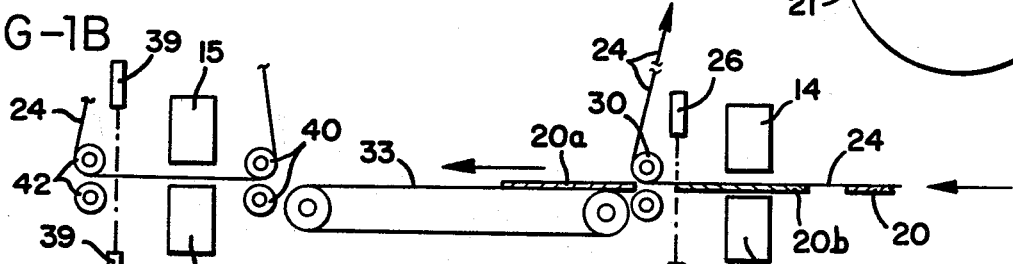
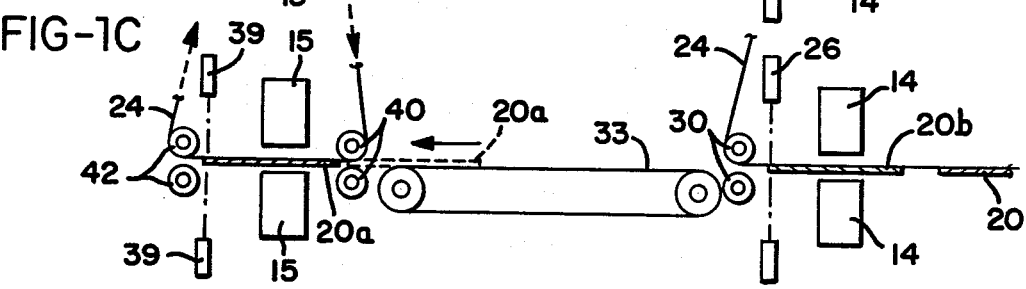
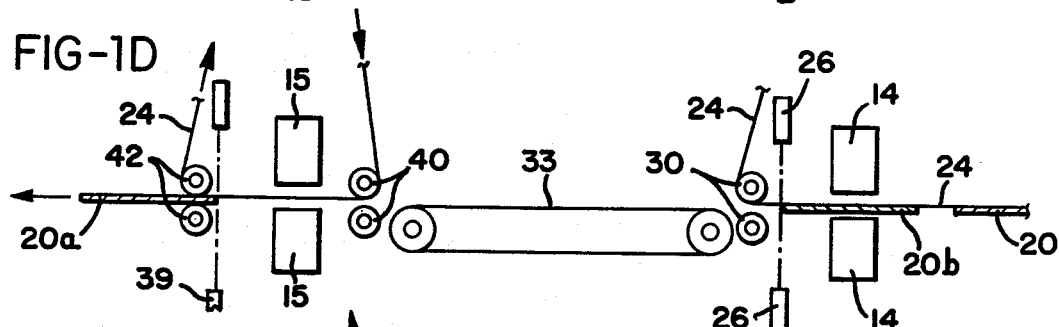
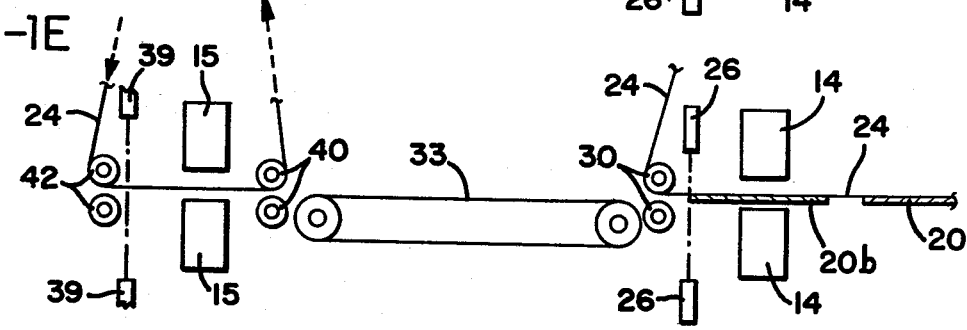

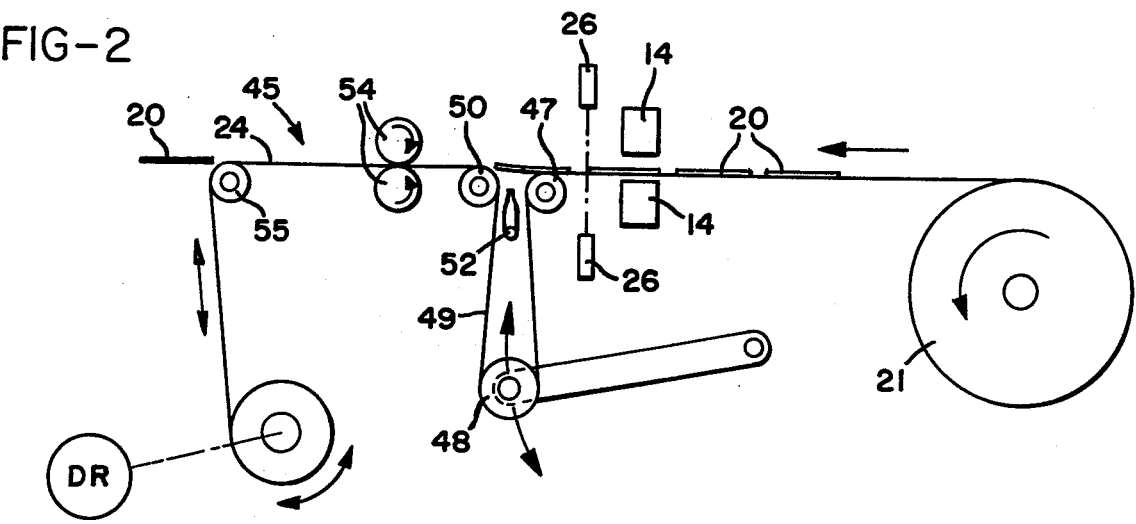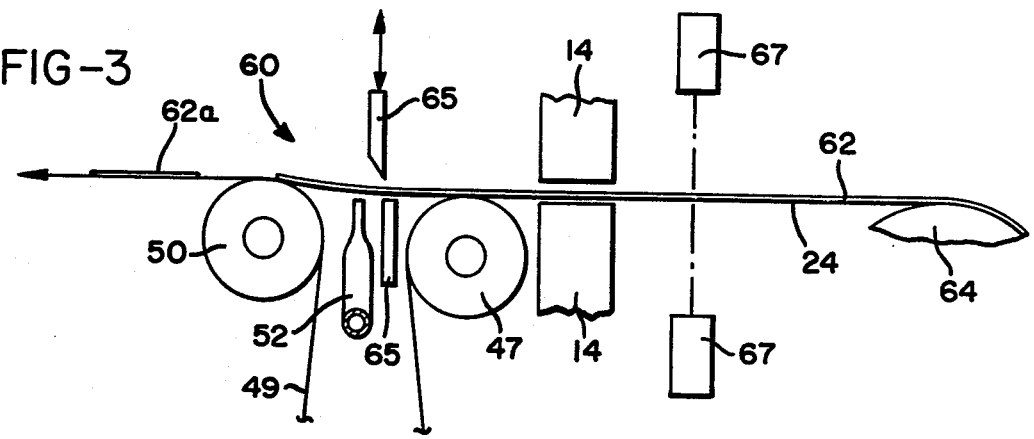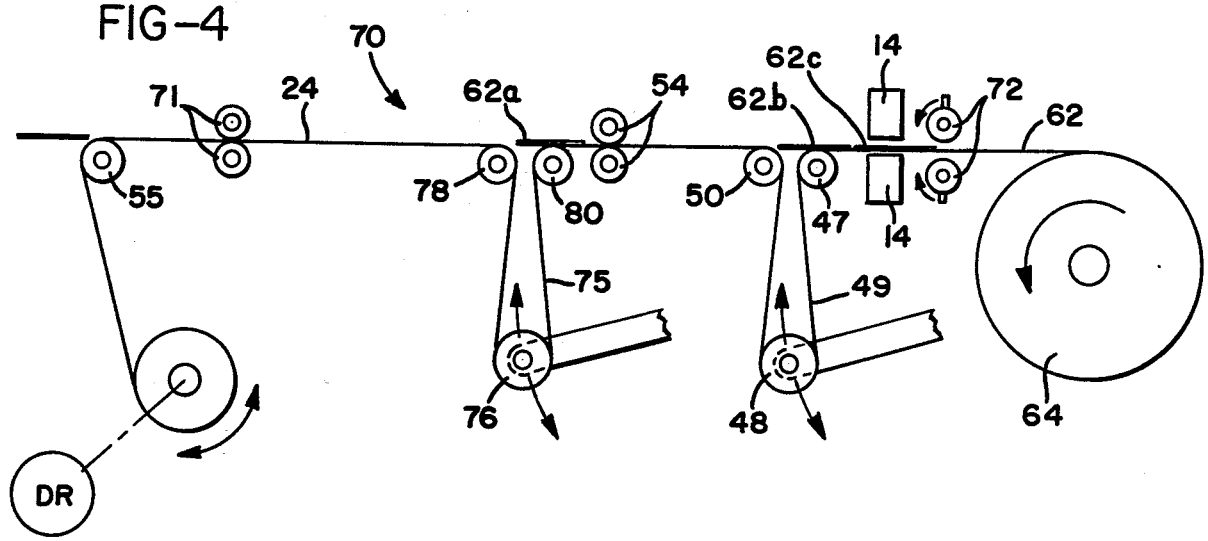

MULTI-IMPRESSION PRINTER FOR PRESSURE SENSITIVE LABELS

BACKGROUND OF THE INVENTION

This invention relates to label printing, and more particularly to a method and apparatus for multi-impression printing of labels having pressure sensitive adhesive.

Pressure sensitive labels provide many advantages, but also many problems, one of which is protecting the adhesive until ready for use. Much effort has been devoted to surmounting these problems, as shown generally, for example, in the devices of Canadian Pat. No. 795,643. Another reference, U.S. Pat. No. 3,556,898, assigned to the assignee of the present invention, discloses a Label Printing and Dispensing Apparatus directed to printing and issuing pressure sensitive labels in an automatic computing scale system.

In order to reduce costs and improve efficiencies, many merchandising operations use automatic computing scale systems to weigh each product portion automatically, calculate the price, and issue an appropriately printed label. When the amount of "variable" information is small, prior art devices have printed pressure sensitive labels quite satisfactorily. However, when large amounts of variable information are printed, difficulties may arise since the printing must normally be completed before the label is removed from its release web (commonly some type of waxy paper). It is therefore common practice to print as much information as possible just before the label and release web are separated and the label is ejected from the machine. Thus the printing station becomes quite crowded and complicated.

Alternatively, several printing stations may be used, and this has been done with labels using adhesives which are not immediately active (e.g., heat activated), since the individual labels may be moved easily from one printing station to the next. However, since pressure sensitive labels are not normally removed from the release web until all printing is completed, such labels have not been separately advanced through such prior art multiple printing stations. Thus, several such labels are effectively pre-printed upstream and must then be purged each time the variable information is changed at any but the last printing station. Further, means (or personnel) must identify which label or ticket is actually the correct one. Depending on the circumstances, this can be quite costly, especially where the user's label needs change frequently throughout the day.

SUMMARY OF THE INVENTION

Briefly, the present invention separates a label from its release web backing immediately after printing at the first of several printing stations. The label is then advanced to subsequent printing stations without further movement of the label supply, while the release web is guided along a somewhat different path to the same printing stations. Intermediate the printing stations, one or more dancer rolls form interim supply loops in the release web material.

In order to deliver the label to a subsequent printing station, the label is temporarily reattached to backing drawn from an adjacent interium supply. The temporary backing supports and protects the label and adhesive for printing at this subsequent station, following which the label and backing are again separated. The process is repeated as many times as desired, until the label issues from the printing machine.

Since the total length of release web backing required for advancing the label through the printing stations usually exceeds the amount added as each label leaves the first station, the present invention moves the release web backwardly and reaccumulates it under the dancer rolls between the printing of each label.

With the present invention, discrete or continuous label stock may be used, and the labels may be either preprinted or plain. Where plain, continuous stock is used, the labels may be individually varied in length as desired. In all cases, waste is eliminated since each label is printed only as needed. Furthermore, the several printing operations may be performed at the most convenient locations within the multi-impression label printer. It is no longer necessary to crowd as many printing operations as possible into as few stations as possible as close as possible to the point where the labels issue.

It is therefore an object of the present invention to provide an apparatus and method for multi-impression printing of label stock having pressure sensitive adhesive; a printer and method enabling all printing operations to be performed while the pressure sensitive adhesive is protected by a release web; in which each individual label is detached from the release web in conjunction with the first printing operations and then advanced to subsequent printing stations; in which the labels are reattached to a release backing for subsequent printing operations; in which no labels are wasted; and to accomplish the above objects, purposes, and methods in an economical and uncomplicated manner readily adaptable to a wide variety of label printing applications.

BRIEF DESCRIPTION OF THE DRAWINGS

FIG. 1A is a diagrammatic illustration of a multi-impression printer according to the present invention;

FIGS. 1B–1E illustrate the printing of a label on the FIG. 1A printer;

FIG. 2 shows a modified version of the FIG. 1 printer;

FIG. 3 is a detail of another modification to the FIG. 1 printer; and

FIG. 4 illustrates still another modification, in which three printing stations at variable spacings are employed.

DESCRIPTION OF THE PREFERRED EMBODIMENT

FIG. 1 shows a multi-impression printer 10 for printing information at several printing stations such as stations 14 and 15. Any suitable printer may be used, such as the mechanism disclosed in the above-noted U.S. Pat. No. 3,556,898.

Printer 10 is designed for printing individual labels 20 supplied from a continuous roll 21. The individual labels 20 constitute an imprintable top layer which is backed by a pressure sensitive adhesive which is covered and protected, in turn, by a removable continuous release web or cover strip 24. Roll 21 thus constitutes a roll of discrete label stock from which the continuous release web 24 may be drawn to supply a series of individual labels 20a, 20b, etc. (FIGS. 1A–1E.

As shown in FIG. 1A, when a label 20a is to be printed it is first moved to a printing station, such as an impact printer 14, which prints a first pattern on the label. Optional sensors, such as photodetectors 26, may be used for detecting each label for proper positioning.

After the first pattern has been printed at the first station 14, web 24 is advanced by a drive 28 to draw the first label 20a, having the first printed pattern thereon, through a stripping or detaching station 30. Station 30 is illustrated as two rollers around which web 24 is drawn at a sharp angle, but any appropriate stripping device may be used, such as that illustrated in the above-noted U.S. Pat. No. 3,556,898. Ideally, label 20a, will be released from web or backing 24 (FIG. 1B) as the next label 20b is moved into proper position in printing station 14. As described further below, all remaining printing operations on label 20a require no further advance of the remaining labels 20 and web 24 in the label stock supply roll 21.

With reference to FIG. 1B, the first label 20a is now advanced toward the second printing station 15 by any suitable conveyor means, such as conveyor belt 33. The label may be held on the conveyor by a vacuum, if desired, or a transfer arm device or other conveyance may be used in place of conveyor 33.

With prior art printers, the release web 24 is ordinarily discarded once a label 20 has been stripped or detached therefrom. In the present invention, however, the release web 24 is not immediately discarded. Rather, following the first detaching station 30, the web is accumulated in an interim supply loop 35 (FIG. 1) formed around a dancer roll 37. Following the supply loop 35 and dancer roll 37, web 24 then passes through the second printing station 15 and is then accumulated on a take-up roll 38.

Thus when the first label 20a arrives at the second printing station 15 (FIG. 1C), it is reattached to web 24 at an attaching station 40 and advanced into printing station 15, without requiring additional web material from supply roll 21. Rather, the web material for the reattaching and advancing of label 20a, as illustrated in FIGS. 1B-1D, is drawn from the interim supply loop 35. Proper registration at printing station 15 may be detached by optional sensors, such as photodetectors 39.

Following the printing of a second pattern on label 20a at second printing station 15, label 20a and web 24 are advanced through a second stripping or detaching station 42 at which the adhesive side of label 20a is again uncovered by removal from web 24. The uncovered label is then caused to issue from the machine, or advanced to another printing station, as desired.

The length of release web 24 used during the various operations at station 40, second printing station 15, and second detaching station 42, may be greater than that received from roll 21 when label 20a is first advanced (FIG. 1A). Thus the present invention contemplates reverse movement of web 24 from take-up roll 38 backward through second printing station 15, in order to replenish the interim supply loope 35. This may be accomplished at any time following ejection of a label from detaching station 42 and prior to the arrival of a subsequent label at attaching station 40. The double-headed arrows in FIG. 1A illustrate this movement of web 24.

FIG. 2 illustrates a modified multi-impression printer 45. Printer 45 uses a roll of individual label stock similar to that used in printer 10, and the roll is therefore also identified by the same reference numeral 21. Likewise, a stationary printing station 14, and a photodetector 26, are used in printer 45. A roller 47 serves as a detaching station 47 for removing the individual labels 20 from the release web 24, and a dancer roll 48 forms an interim supply loop 49 between the detaching station 47 and a reattaching station 50.

Reattaching station 50 is slightly offset vertically from detaching station 47 to help pry the individual labels 20 from the release web 24. An optional air jet 52 may also be provided to assist in detaching the labels from the release web. After the labels are reattached at station 50, they are conveyed to a second printing station 54 which is illustrated as a rotary printing station. The labels are then detached at a second detaching station 55 for ejection from the printer.

The multi-impression printer 45 illustrated in FIG. 2 has the principal advantage that it eliminates the need for a separate conveyor belt 33 or other conveyance in addition to the release web 24. Rather, the release web 24 is used throughout printer 45 for conveying the labels 20 within the printer. Of course, an adequate length of release web material 24 should be maintained in interium supply loop 49 to permit the labels to be transported individually through the machine. As before, the downstream portions of the release web are periodically reversed in direction to replenish the interim supply loop 49.

FIG. 3 illustrates a multi-impression printer 60 similar to that in FIG. 2, and like parts are identified by the same reference numerals. Printer 60, however, is designed for use with continuous label stock 62 attached to release web 24 and supplied from a supply roll 64. Individual labels are severed from the continous label stock 62 by a knife assembly 65, and the subsequent label handling and printing operations are then simultaneously the same as in printer 45 (FIG. 2).

The continuous label stock 62 in printer 60 provides several advantages. If the stock is initially blank, the individual labels 62a which are severed therefrom may be cut to any length desired. Thus the lengths of the labels 62a may be repeatedly varied according to the amount of information to be printed thereon. This is not possible, of course, when the labels are supplied as a series of individual or discrete labels as in roll 21.

When the continuous label stock is preprinted, an optional detecting means such as photodetector 67 (FIG. 3) may be used to maintain proper registry of the preprinted material in printing station 14. In other words, photodetector 67 serves as an index means for identifying the individual labels 62a while they are still joined in the continuous label stock 62. Alternatively, sprocketed tape may be used, such as illustrated in U.S. Pat. No. 3,556,898, and the proper advance thereof may be regulated by mechanical means (e.g., a sprocket wheel) or optical means (e.g., a photodetector) as desired.

FIG. 4 illustrates a further embodiment of this invention. A multi-impression printer 70 includes three printing stations, 14, 54 and 71. Continuous label stock 62 is used, and is cross cut as needed by a conventional flying cutter 72 which cuts the label stock but not the release web 24 therebeneath. An additional interim supply loop 75, dancer roll 76, attaching station 78, and detaching station 80, similar to those in printers 10, 45, and 60, are provided. Printer 70 illustrates that the locations of and spacings between stations 14, 54 and 71 may differ and may be chosen to suit other requirements.

As may be seen, therefore, the present invention provides numerous advantages. It is no longer necessary to locate all printing operations close together and as far "downstream" as possible. Several different patterns may be printed on the label, and each pattern may be printed at whatever locations prove convenient within the multi-impression printer. This has been virtually impossible in the past without substantial wastage of the pressure sensitive labels, since the labels were kept on the release backing until outside the printer. With the present invention no labels are wasted.

The present invention enables pressure sensitive labels to be printed in varying lengths according to individual needs. Alternatively, preprinted labels may be used in either discrete or continuous form.

Any number of printing stations may be used. Printer 70 in FIG. 4 illustrates one means of using three printing stations. Alternatively, a larger interim supply loop 49 could be used in place of supply loop 75 for advancing a label to both stations 54 and 71 (and further if desired). Thus, the label may simply remain continuously on the web after the first reattaching station, eliminating the need for subsequent detaching stations, attaching stations, etc. Even further, the conveyors in printer 10 (FIG. 1) may be eliminated by using the printers 45, 60, and 70 of FIGS. 2-4 to reattach the label directly to the release web material drawn from the interim supply loop 49. It should also be clear that the first detaching station 30 or 47 may be located either upstream of, or just after, the first printing station 14. It is also possible to back up the original supply roll after a label is printed at the first printing station to bring the next label back to the first station, so that no printing at all would have to be done until a label was called for.

While FIGS. 1A-E show a printer 10 in which a conveyor 33 is utilized, this has been presented first only to make it easier to understand the invention. At the present time it is contemplated that the preferred embodiments of the invention will dispense with such conveyors, as illustrated in printers 45, 60, ad 70 (FIGS. 2-4).

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A printer for discrete or continuous label stock having a pressure sensitive adhesive protected by a release web, comprising:
    (a) means for detaching a label from the label stock and the release web,
    (b) means forming an attaching station for receiving said label from said detaching means and temporarily attaching the adhesive side of said label to a release backing,
    (c) means for supplying a release backing to said attaching station for repeated use thereat,
    (d) printing means defining a printing station for printing a pattern on said label, and
    (e) means for advancing said label and said release backing from said attaching station to said printing station.

2. The printer of claim 1 wherein said printing station comprises a first printing station, and further comprising:
    (a) a second printing means defining a second printing station for printing a second pattern on said label, and
    (b) means for advancing said label and release backing from said first printing station to said second printing station.

3. A multi-impression printer for label stock having a pressure sensitive adhesive protected by a release web, comprising:
    (a) means for detaching a label from the label stock and the release web,
    (b) means forming an attaching station for receiving said label from said detaching means and temporarily attaching the adhesive side of said label to a release backing,
    (c) means for supplying a release backing to said attaching station for repeated use thereat,
    (d) first printing means defining a first printing station for printing a first pattern on said label,
    (e) second printing means defining a second printing station for printing a second pattern on said label, and
    (f) means for advancing said label and said release backing from said attaching station to said first and second printing stations.

4. A multi-impression printer for label stock having a pressure sensitive adhesive protected by a release web, comprising:
    (a) first printing means defining a first printing station for printing a first pattern on a portion of the label stock,
    (b) means for defining a label having said first pattern thereon from the label stock and the release web following said first printing station,
    (c) means forming an attaching station for receiving said label from said detaching means and temporarily attaching the adhesive side of said label to a release backing,
    (d) means for supplying a release backing to said attaching station for repeated use thereat,
    (e) second printing means defining a second printing station for printing a second pattern on said label, and
    (f) means for advancing said label and said release backing from said attaching station to said second printing station.

5. A multi-impression printer for label stock having a pressure sensitive adhesive attached to and protected by a release web, comprising:
    (a) first printing means defining a first printing station for printing a first pattern on the label stock,
    (b) means for detaching a label having said first pattern thereon from the label stock and the release web following said first printing station,
    (c) means forming an attaching station for reattaching the adhesive side of said label onto the release web,
    (d) means for carrying the release web on a path from said detaching means to said attaching station,
    (e) means for receiving said label from said detaching means and advancing said label to said attaching station on a path different from the path of the release web,
    (f) second printing means defining a second printing station for printing a second pattern on said label, and
    (g) means for advancing said reattached release web and label from said attaching station to said second printing station.

6. The printer of claim 5 wherein said means for carrying the release web to said attaching station further comprises means for accumulating an interim supply of the release web and for utilizing at least a portion of said interim supply for reattaching said label to the release web at said attaching station.

7. The printer of claim 5 wherein the label stock comprises a series of discrete labels.

8. The printer of claim 5 wherein the label stock comprises a continuous strip of label material, and wherein said detaching means further comprises cutting means for cutting a label from said strip of label material.

9. The printer of claim 8 wherein said strip of label material further includes index means for identifying individual labels while still joined in said strip.

10. The printer of claim 9 further comprising means for detecting said index means to control said cutting means in response thereto.

11. A multi-impression printer for label stock having a pressure sensitive adhesive attached to and protected by a release web, comprising:
    (a) first printing means defining a first printing station at a first location for printing a first pattern on the label stock,
    (b) first detaching means for detaching a label having said first pattern thereon from the label stock and the release web following said first printing station,
    (c) means forming an attaching station for reattaching the adhesive side of said label onto the release web,
    (d) means for carrying the release web from said first detaching means to said attaching station, said carrying means including means for accumulating an interim supply of the release web, a portion of said supply being accumulated as said label is detached, and for utilizing a portion of said interim supply for reattaching said label to the release web at said attaching station,
    (e) means for receiving said label from said first detaching means and advancing said label to said attaching station separately and independently of the release web,
    (f) second printing means defining a second printing station at a second location removed from said first location for printing a second pattern on said label,
    (g) means for advancing said reattached release web and label from said attaching station to said second printing station, and
    (h) second detaching means for detaching said label from the release web following said second printing station.

12. The printer of claim 11 wherein the label stock comprises a continuous strip of label material, and wherein said detaching means further comprises cutting means for cutting a label of predetermined length from said strip of label material.

13. The printer of claim 11 further comprising additional carrying and accumulating, receiving and advancing, attaching, printing, and detaching means for receiving said label and the release web from said second printing station and for performing at least one additional printing operation on said label at at least one additional location removed from said first and second locations.

14. A multi-impression printer for imprint-receiving material which includes a continuous removable backing strip and label stock having pressure sensitive adhesive facing said backing strip, comprising:
    (a) first printing means defining a first printing station for printing a first pattern on said label stock,
    (b) means for moving the backing strip out of said first printing station upon completion of said first pattern print to transport the printed label stock beyond said station and present new, unprinted label stock in said station, said moving means including means for discontinuing movement upon presentation of the new, unprinted stock in said station,
    (c) means for detaching the printed label stock from the backing strip upon exiting from said first printing station, said detached label stock forming a label,
    (d) means forming an attaching station for temporarily attaching said detached label to a means for supporting said label,
    (e) means for supplying such a means for supporting said label to said attaching station for repeated use thereat,
    (f) means for receiving said printed, unbacked label from said means for detaching, and for advancing said label to said attaching station,
    (g) means for attaching said label to said supporting means at said attaching station,
    (h) second printing means defining a second printing station for printing a second pattern on said label while attached to said supporting means,
    (i) means for advancing said label and said supporting means in a forward direction from said attaching station to said second printing station, and
    (j) means for delivering said label from said second printing station.

15. The printer of claim 14 wherein said supporting means is comprised of a section of said backing strip.

16. The printer of claim 14 wherein said means for detaching the printed label includes means for cutting a continuous strip of said label stock.

17. The printer of claim 14 wherein said means for detaching the printed label includes means for stripping pre-segregated printed labels from said backing strip.

18. The printer of claim 14 wherein said means for receiving said printed unbacked label comprises a moving belt conveyor.

19. The printer of claim 14 wherein said means for delivering said label includes means for separating said label and said supporting means.

20. The printer of claim 14 wherein said means for detaching said label includes means for cutting said label stock while on said backing strip to segregate labels thereon.

21. The printer of claim 14 wherein said means for attaching includes means for driving at least a portion of said supporting means in the forward and also the reverse direction.

22. A method for multiple image printing of label stock having an imprintable top layer backed by a pressure sensitive adhesive and covered by a removable continuous cover strip, said method comprising:
    (a) printing a first image on a segment of said top layer at a first printing station,
    (b) separating the printed segment of said top layer from said cover strip and the remaining portion of said top layer,
    (c) advancing said printed segment independently of said cover strip to a location adjacent a second printing station,
    (d) moving said cover strip independently of said printed segment to a position selected for reattachment of said printed segment,
    (e) reattaching said printed segment to said cover strip, (f) transporting the segment covered portion of said cover strip and said printed segment in a forward direction into said second printing station, and
(g) printing a second image on said printed segment in said second printing station.

23. The method of claim 22 further including the steps of conveying said printed segment into at least one additional printing station and printing at least one additional image thereon.

24. The method of claim 22 wherein said step of moving said cover strip includes moving said cover strip in the forward direction.

25. The method of claim 22 further including the step of advancing said printed segment from the final one of said printing stations while attached to a portion of said cover strip.

26. The method of claim 22 further including the steps of removing said cover strip from said printed segment and then issuing an uncovered printed segment.

27. The method of claim 22 wherein said step of moving said cover strip includes moving said cover strip in the reverse direction.

* * * * *

UNITED STATES PATENT AND TRADEMARK OFFICE
CERTIFICATE OF CORRECTION

PATENT NO. : 4,111,121
DATED : September 5, 1978
INVENTOR(S) : Charles J. Borum

It is certified that error appears in the above-identified patent and that said Letters Patent are hereby corrected as shown below:

Col. 2, line 28, delete "operations" and insert -- operation --.

Col. 3, line 41, delete "detached" and insert -- detected --.

Col. 3, line 57, delete "loope" and insert -- loop --.

Col. 4, lines 33 & 34, delete "simultaneously" and insert -- substantially --.

Col. 5, line 38, delete "ad" and insert -- and --.

Col. 6, line 29, claim 4, delete "defining" and insert -- detaching --.

Signed and Sealed this

Fifth Day of June 1979

[SEAL]

Attest:

RUTH C. MASON
Attesting Officer

DONALD W. BANNER
Commissioner of Patents and Trademarks